US009830926B2

(12) United States Patent
Helwani et al.

(10) Patent No.: US 9,830,926 B2
(45) Date of Patent: Nov. 28, 2017

(54) SIGNAL PROCESSING APPARATUS, METHOD AND COMPUTER PROGRAM FOR DEREVERBERATING A NUMBER OF INPUT AUDIO SIGNALS

(71) Applicant: Huawei Technologies Co., Ltd., Shenzhen (CN)

(72) Inventors: Karim Helwani, Munich (DE); Liyun Pang, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/248,597

(22) Filed: Aug. 26, 2016

(65) Prior Publication Data

US 2016/0365100 A1 Dec. 15, 2016

Related U.S. Application Data

(63) Continuation of application No. PCT/EP2014/058913, filed on Apr. 30, 2014.

(51) Int. Cl.
*H04B 3/20* (2006.01)
*G10L 21/0232* (2013.01)
(Continued)

(52) U.S. Cl.
CPC ........ *G10L 21/0232* (2013.01); *G10L 19/008* (2013.01); *G10L 21/0208* (2013.01); *G10L 2021/02082* (2013.01)

(58) Field of Classification Search
USPC ......... 381/22, 23, 20, 63, 64, 66, 71.11, 150
See application file for complete search history.

(56) References Cited

U.S. PATENT DOCUMENTS 8,676,571 B2 * 3/2014 Otani .................. G10L 21/0208 381/56
2004/0120535 A1 * 6/2004 Woods ................... H04R 3/007 381/96

(Continued)

FOREIGN PATENT DOCUMENTS

JP 2004334218 A 11/2004
JP 2006148453 A 6/2006
WO 2012086834 A1 6/2012

OTHER PUBLICATIONS

Krueger, A., et al., "A Model-Based Approach to Joint Compensation of Noise and Reverberation for Speech Recognition," Jun. 23, 2011, 5 pages.

(Continued)

*Primary Examiner* — Yosef K Laekemariam
(74) *Attorney, Agent, or Firm* — Conley Rose, P.C.

(57) ABSTRACT

A signal processing apparatus for dereverberating a number of input audio signals, where the signal processing apparatus includes a processor configured to transform the number of input audio signals into a transformed domain to obtain input transformed coefficients, the input transformed coefficients being arranged to form an input transformed coefficient matrix, determine filter coefficients upon the basis of eigenvalues of a signal space, the filter coefficients being arranged to form a filter coefficient matrix, convolve input transformed coefficients of the input transformed coefficient matrix by filter coefficients of the filter coefficient matrix to obtain output transformed coefficients, and the output transformed coefficients being arranged to form an output transformed coefficient matrix.

15 Claims, 8 Drawing Sheets

(51) Int. Cl.
*G10L 21/0208* (2013.01)
*G10L 19/008* (2013.01)

(56) References Cited

U.S. PATENT DOCUMENTS

2004/0220800 A1 11/2004 Kong et al.
2013/0287225 A1 10/2013 Niwa et al.

OTHER PUBLICATIONS

Schmid, D., et al., "A Maximum a Posteriori Approach to Multichannel Speech Dereverberation and Denoising," International Workshop on Acoustic Signal Enhancement, Sep. 4-6, 2012, 4 pages.
Krueger, A., et al., "Bayesian Feature Enhancement for ASR of Noisy Reverberant Real-World Data," Jan. 2012, 4 pages.
Schwartz, B., et al., "Multi-Microphone Speech Dereverberation using Expectation-Maximization and Kalman Smoothing," Sep. 2013, 5 pages.
Habets, E., "Single- and Multi-Microphone Speech Dereverberation using Spectral Enhancement," Jan. 2007, 257 pages.
Buchner, H., et al., "Trinicon for Dereverberation of Speech and Audio Signals," Chapter 10, Speech Dereverberation, 2010, pp. 311-385.
Huang, Y., et al., "A Blind Channel Identification-Based Two-Stage Approach to Separation and Dereverberation of Speech Signals in a Reverberant Environment," IEEE Transactions on Speech and Audio Processing, vol. 13, No. 5, Sep. 2005, pp. 882-895.
Yoshioka, T., et al., "Blind Separation and Dereverberation of Speech Mixtures by Joint Optimization," IEEE Transactions on Audio, Speech, and Language Processing, vol. 19, No. 1, Jan. 2011, pp. 69-84.
Schwarz, A., et al., "Coherence-based Dereverberation for Automatic Speech Recognition," 40th Annual German Congress on Acoustics, Retrieved from the Internet: URL: http://andreas-s.net/papers/schwarz_daga2014.pdf [retrieved on Nov. 18, 2014], Mar. 10, 2014, 2 pages.
Walther, A., et al., "Direct-Ambient Decomposition and Upmix of Surround Signals," IEEE Workshop on Applications of Singal Processing to Audio and Acoustics, Oct. 16-19, 2011, pp. 277-280.
Helwani, K., et al., "Multichannel Acoustic Echo Suppression," IEEE International Conference on Acoustics, Speech and Signal Processing, May 26, 2013, pp. 600-604.
Rashobh, R., et al., "Multichannel Equalization in the KLT and Frequency Domains With Application to Speech Dereverberation," IEEE/ACM Transactions on Audio, Speech, and Language Processing, vol. 22, No. 3, Mar. 2014, pp. 634-646.
Wang, L., et al., "Speech Recognition Using Blind Source Separation and Dereverberation Method for Mixed Sound of Speech and Music," Asia-Pacific Signal and Information Processing Association Annual Summit and Conference, Oct. 29, 2013, 4 pages.
Foreign Communication From a Counterpart Application, PCT Application No. PCT/EP2014/058913, International Search Report dated Jan. 29, 2015, 8 pages.
Foreign Communication From a Counterpart Application, PCT Application No. PCT/EP2014/058913, Written Opinion dated Jan. 29, 2015, 13 pages.
Machine Translation and Abstract of Japanese Application No. 2006148453, dated Jun. 8, 2006, 15 pages.
Foreign Communication From A Counterpart Application, Japanese Application No. 2016-549328, Japanese Office Action dated Oct. 3, 2017, 4 pages.
Foreign Communication From A Counterpart Application, Japanese Application No. 2016-549328, English Translation of Japanese Office Action dated Oct. 3, 2017, 5 pages.

* cited by examiner

SIGNAL PROCESSING APPARATUS, METHOD AND COMPUTER PROGRAM FOR DEREVERBERATING A NUMBER OF INPUT AUDIO SIGNALS

CROSS-REFERENCE TO RELATED APPLICATION

This application is a continuation of International Application No. PCT/EP2014/058913, filed on Apr. 30, 2014, which is hereby incorporated by reference in its entirety.

TECHNICAL FIELD

Embodiments of the disclosure relate to the field of audio signal processing, in particular to the field of dereverberation and audio source separation.

BACKGROUND

Dereverberation and audio source separation is a major challenge in a number of applications, such as multi-channel audio acquisition, speech acquisition, or up-mixing of mono-channel audio signals. Applicable techniques can be classified into single-channel techniques and multi-channel techniques.

Single-channel techniques can be based on a minimum statistics principle and can estimate an ambient part and a direct part of the audio signal separately. Single-channel techniques can further be based on a statistical system model. Common single-channel techniques, however, suffer from a limited performance in complex acoustic scenarios and may not be generalized to multi-channel scenarios.

Multi-channel techniques can aim at inverting a multiple input/multiple output (MIMO) finite impulse response (FIR) system between a number of audio signal sources and microphones, wherein each acoustic path between an audio signal source and a microphone can be modelled by an FIR filter. Multi-channel techniques can be based on higher order statistics and can employ heuristic statistical models using training data. Common multi-channel techniques, however, suffer from a high computational complexity and may not be applicable in single-channel scenarios.

In the document Herbert Buchner et al., "Trinicon for dereverberation of speech and audio signals", Speech Dereverberation, Signals and Communication Technology, pages 311-385, Springer London, 2010, an approach to estimate an ideal inverse system is described.

In the document Andreas Walther et al., "Direct-Ambient Decomposition and Upmix of Surround Signals", Institute of Electrical and Electronics Engineers (IEEE) Workshop on Applications of Signal Processing to Audio and Acoustics, 2011, an approach to estimate diffuse and direct audio components is described.

SUMMARY

It is an object of embodiments of the disclosure to provide an efficient concept for dereverberating a number of input audio signals. The concept can also be applied for audio source separation within the number of input audio signals.

This object is achieved by the features of the independent claims. Further implementation forms are apparent from the dependent claims, the description and the figures.

Aspects and implementation forms of the disclosure are based on the finding that a filter coefficient matrix can be designed in a way that each output audio signal is coherent to its own history within a set of consequent time intervals and orthogonal to the history of other audio source signals. The filter coefficient matrix can be determined upon the basis of an initial guess of the audio source signals or upon the basis of a blind estimation approach. Embodiments of the disclosure can be applied using single-channel audio signals as well as multi-channel audio signals.

According to a first aspect, embodiments of the disclosure relate to a signal processing apparatus for dereverberating a number of input audio signals, the signal processing apparatus comprising a transformer being configured to transform the number of input audio signals into a transformed domain to obtain input transformed coefficients, the input transformed coefficients being arranged to form an input transformed coefficient matrix, a filter coefficient determiner being configured to determine filter coefficients upon the basis of eigenvalues of a signal space, the filter coefficients being arranged to form a filter coefficient matrix, a filter being configured to convolve input transformed coefficients of the input transformed coefficient matrix by filter coefficients of the filter coefficient matrix to obtain output transformed coefficients, the output transformed coefficients being arranged to form an output transformed coefficient matrix, and an inverse transformer being configured to inversely transform the output transformed coefficient matrix from the transformed domain to obtain a number of output audio signals. The number of input audio signals can be one or more than one. Thus, an efficient concept for dereverberation and/or audio source separation can be realized.

In a first implementation form of the apparatus according to the first aspect as such, the filter coefficient determiner is configured to determine the signal space upon the basis of an input auto correlation matrix of the input transformed coefficient matrix. Thus, the signal space can be determined upon the basis of correlation characteristics of the input audio signals.

In a second implementation form of the apparatus according to the first aspect as such or any preceding implementation form of the first aspect, the transformer is configured to transform the number of input audio signals into frequency domain to obtain the input transformed coefficients. Thus, frequency domain characteristics of the input audio signals can be used to obtain the input transformed coefficients. The input transformed coefficients can relate to a frequency bin, e.g. having an index k, of a discrete Fourier transform (DFT) or a fast Fourier transform (FFT).

In a third implementation form of the apparatus according to the first aspect as such or any preceding implementation form of the first aspect, the transformer is configured to transform the number of input audio signals into the transformed domain for a number of past time intervals to obtain the input transformed coefficients. Thus, time domain characteristics of the input audio signals within a current time interval and past time intervals can be used to obtain the input transformed coefficients. The input transformed coefficients can relate to a time interval, e.g. having an index n, of a short time Fourier transform (STFT).

In a fourth implementation form of the apparatus according to the third implementation form of the first aspect, the filter coefficient determiner is configured to determine input auto coherence coefficients upon the basis of the input transformed coefficients, the input auto coherence coefficients indicating a coherence of the input transformed coefficients associated to a current time interval and a past time interval, the input auto coherence coefficients being arranged to form an input auto coherence matrix, and wherein the filter coefficient determiner is further configured to determine the filter coefficients upon the basis of the input auto coherence matrix. Thus, a coherence within the input audio signals can be used to determine the filter coefficients.

In a fifth implementation form of the apparatus according to the first aspect as such or any preceding implementation form of the first aspect, the filter coefficient determiner is configured to determine the filter coefficient matrix according to the following equation:

$$H=\Phi_{xx}^{-1}\Gamma_{xS_0}\cdot(\Gamma_{xS_0}^{H}\Phi_{xx}^{-1}\Gamma_{xS_0})^{-1},$$

wherein H denotes the filter coefficient matrix, x denotes the input transformed coefficient matrix, $S_0$ denotes an auxiliary transformed coefficient matrix, $\Phi_{xx}$ denotes an input auto correlation matrix of the input transformed coefficient matrix, $\Gamma_{xS_0}$ denotes a cross coherence matrix between the input transformed coefficient matrix and the auxiliary transformed coefficient matrix, and $\Gamma_{xS_0}^{H}$ denotes Hermitian transpose of the $\Gamma_{xS_0}$. Thus, the filter coefficient matrix can be determined efficiently upon the basis of an initial guess of the auxiliary transformed coefficient matrix.

In a sixth implementation form of the apparatus according to the fifth implementation form of the first aspect, the signal processing apparatus further comprises an auxiliary audio signal generator being configured to generate a number of auxiliary audio signals upon the basis of the number of input audio signals, and a further transformer being configured to transform the number of auxiliary audio signals into the transformed domain to obtain auxiliary transformed coefficients, the auxiliary transformed coefficients being arranged to form the auxiliary transformed coefficient matrix. Thus, the auxiliary transformed coefficient matrix can be determined upon the basis of the input audio signals.

The auxiliary audio signal generator can generate the number of auxiliary audio signals using a beamforming technique, e.g. a delay-and-sum beamforming technique, and/or using audio signals of spot microphones. The auxiliary audio signal generator can therefore provide for an initial separation of a number of audio sources.

In a seventh implementation form of the apparatus according to the first aspect as such or the first to fourth implementation form of the first aspect, the filter coefficient determiner is configured to determine the filter coefficient matrix according to the following equation:

$$H=\Phi_{xx}^{-1}\hat{\Gamma}_{sS}\cdot(\hat{\Gamma}_{sS}^{H}\Phi_{xx}^{-1}\hat{\Gamma}_{sS})^{-1},$$

wherein H denotes the filter coefficient matrix, x denotes the input transformed coefficient matrix, $\Phi_{xx}$ denotes an input auto correlation matrix of the input transformed coefficient matrix, and $\hat{\Gamma}_{sS}$ denotes an estimate auto coherence matrix. Thus, the filter coefficient matrix can be determined efficiently upon the basis of an estimate auto coherence matrix.

In an eighth implementation form of the apparatus according to the seventh implementation form of the first aspect, the filter coefficient determiner is configured to determine the estimate auto coherence matrix according to the following equation:

$$\hat{\Gamma}_{sS}(k,n):=(I_M\otimes U^{-1})\cdot\Gamma_{xX}\cdot U,$$

wherein $\hat{\Gamma}_{sS}$ denotes the estimate auto coherence matrix, x denotes the input transformed coefficient matrix, $\Gamma_{xX}$ denotes an input auto coherence matrix of the input transformed coefficient matrix, $I_M$ denotes an identity matrix of matrix dimension M, U denotes an eigenvector matrix of an eigenvalue decomposition performed upon the basis of the input auto coherence matrix. Thus, the estimate auto coherence matrix can efficiently be determined upon the basis of an eigenvalue decomposition.

In a ninth implementation form of the apparatus according to the first aspect as such or any preceding implementation form of the first aspect, the signal processing apparatus further comprises a channel determiner being configured to determine channel transformed coefficients upon the basis of the input transformed coefficients of the input transformed coefficient matrix and the filter coefficients of the filter coefficient matrix, the channel transformed coefficients being arranged to form a channel transformed matrix. Thus, a blind channel estimation can be performed.

In a tenth implementation form of the apparatus according to the ninth implementation form of the first aspect, the channel determiner is configured to determine the channel transformed matrix according to the following equation:

$$\hat{G}(k,n)=H^{H}x(k,n)\mathrm{diag}\{X_1(k,n), X_2(k,n), \ldots, X_P(k,n)\}^{-1})^{-1},$$

wherein $\hat{G}$ denotes the channel transformed matrix, x denotes the input transformed coefficient matrix, H denotes the filter coefficient matrix, $H^H$ denotes Hermitian transpose of the H, and $X_1$ to $X_P$ denote input transformed coefficients. Thus, the channel transformed matrix can be determined efficiently.

In an eleventh implementation form of the apparatus according to the first aspect as such or any preceding implementation form of the first aspect, the number of input audio signals comprise audio signal portions being associated to a number of audio signal sources, and the signal processing apparatus is configured to separate the number of audio signal sources upon the basis of the number of input audio signals. Thus, a dereverberation and/or audio source separation can be performed.

According to a second aspect, embodiments of the disclosure relate to a signal processing method for dereverberating a number of input audio signals, the signal processing method comprising transforming the number of input audio signals into a transformed domain to obtain input transformed coefficients, the input transformed coefficients being arranged to form an input transformed coefficient matrix, determining filter coefficients upon the basis of eigenvalues of a signal space, the filter coefficients being arranged to form a filter coefficient matrix, convolving input transformed coefficients of the input transformed coefficient matrix by filter coefficients of the filter coefficient matrix to obtain output transformed coefficients, the output transformed coefficients being arranged to form an output transformed coefficient matrix, and inversely transforming the output transformed coefficient matrix from the transformed domain to obtain a number of output audio signals. The number of input audio signals can be one or more than one. Thus, an efficient concept for dereverberation and/or audio source separation can be realized.

The signal processing method can be performed by the signal processing apparatus. Further features of the signal processing method can directly result from the functionality of the signal processing apparatus.

In a first implementation form of the method according to the second aspect as such, the signal processing method further comprises determining the signal space upon the basis of an input auto correlation matrix of the input transformed coefficient matrix. Thus, the signal space can be determined upon the basis of correlation characteristics of the input audio signals.

According to a third aspect, embodiments of the disclosure relate to a computer program comprising a program code for performing the signal processing method according to the second aspect as such or any implementation form of the second aspect when executed on a computer. Thus, the method can be performed in an automatic and repeatable manner.

The computer program can be provided in form of a machine-readable code. The computer program can comprise a series of commands for a processor of the computer. The processor of the computer can be configured to execute the computer program. The computer can comprise a processor, a memory, and/or input/output means.

Embodiments of the disclosure can be implemented in hardware and/or software.

BRIEF DESCRIPTION OF DRAWINGS

Further embodiments of the disclosure will be described with respect to the following figures.

DETAILED DESCRIPTION OF EMBODIMENTS

Figure 1:
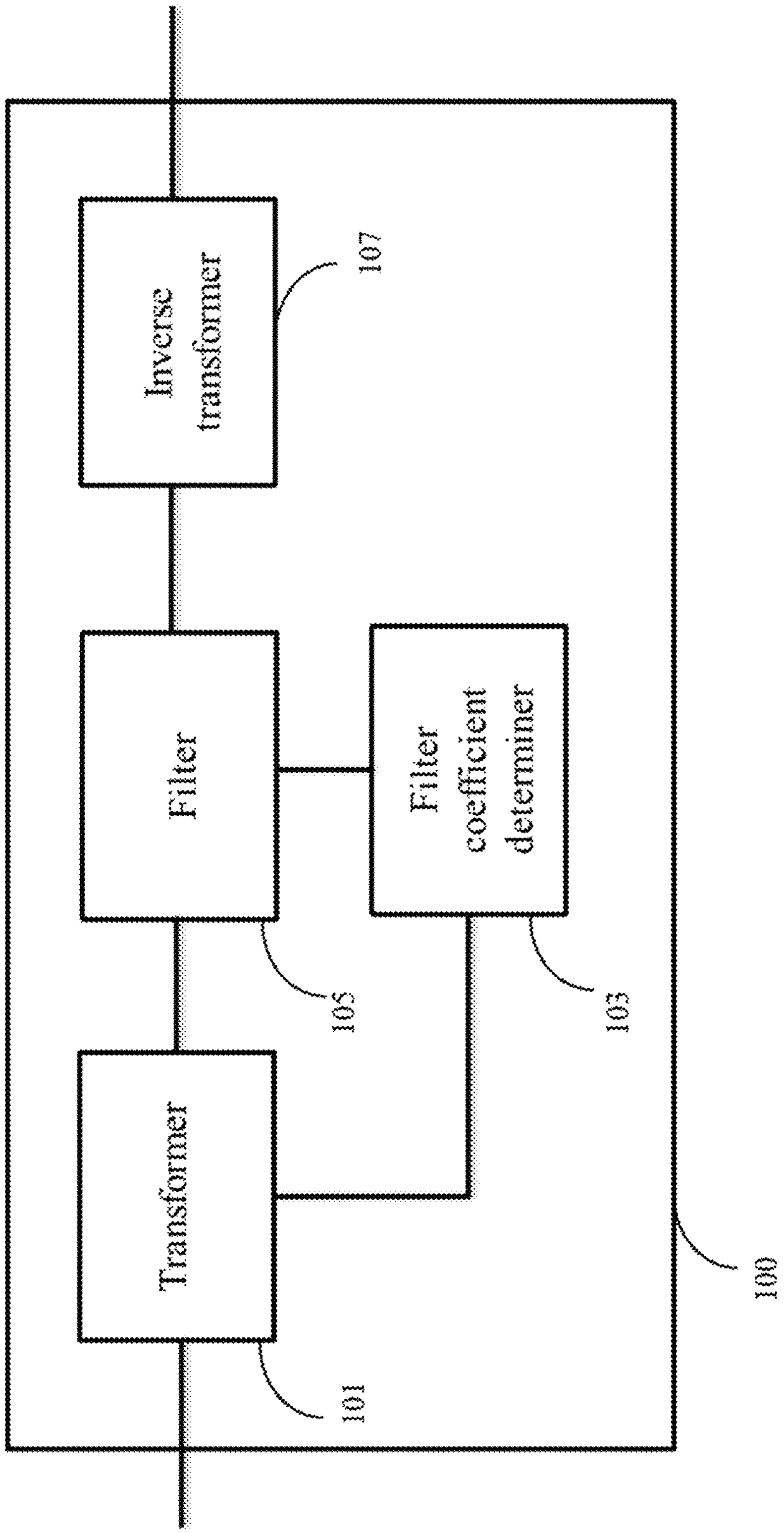
FIG. 1 shows a diagram of a signal processing apparatus for dereverberating a number of input audio signals according to an implementation form.

FIG. 1 shows a diagram of a signal processing apparatus 100 for dereverberating a number of input audio signals according to an implementation form.

The signal processing apparatus 100 comprises a transformer 101 being configured to transform the number of input audio signals into a transformed domain to obtain input transformed coefficients, the input transformed coefficients being arranged to form an input transformed coefficient matrix, a filter coefficient determiner 103 being configured to determine filter coefficients upon the basis of eigenvalues of a signal space, the filter coefficients being arranged to form a filter coefficient matrix, a filter 105 being configured to convolve input transformed coefficients of the input transformed coefficient matrix by filter coefficients of the filter coefficient matrix to obtain output transformed coefficients, the output transformed coefficients being arranged to form an output transformed coefficient matrix, and an inverse transformer 107 being configured to inversely transform the output transformed coefficient matrix from the transformed domain to obtain a number of output audio signals.

Figure 2:
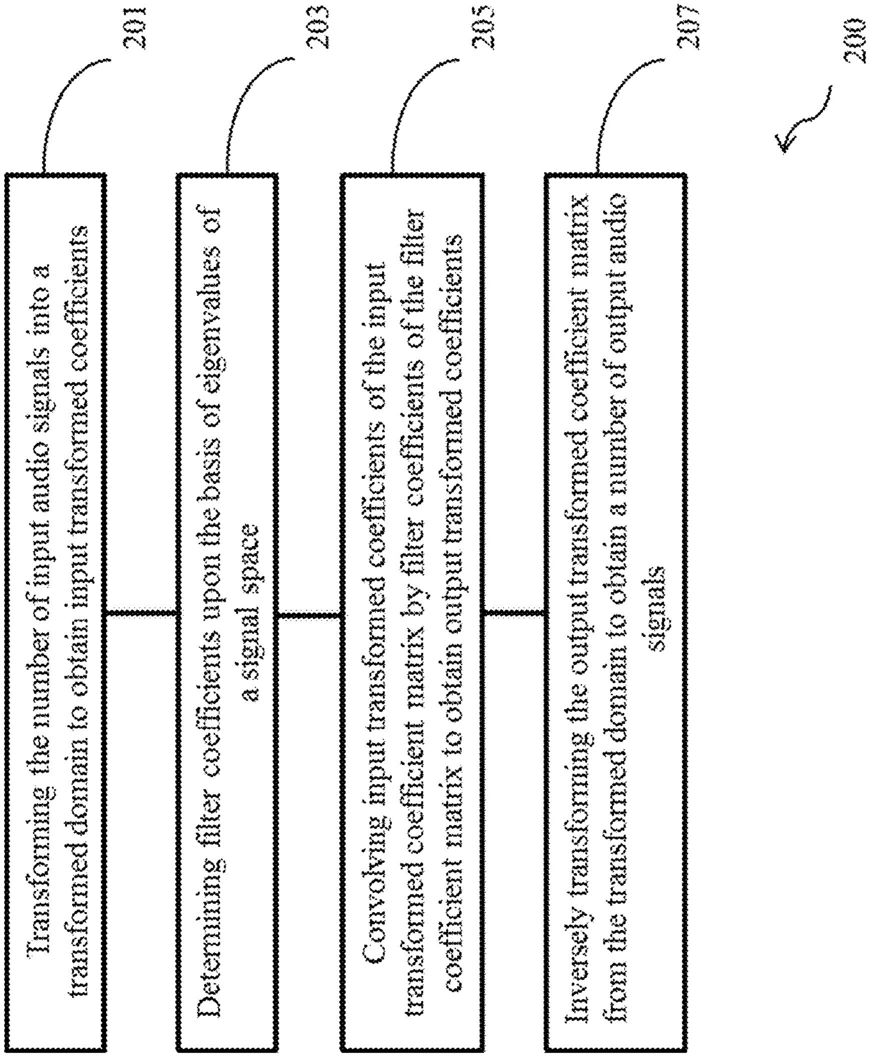
FIG. 2 shows a diagram of a signal processing method for dereverberating a number of input audio signals according to an implementation form.

FIG. 2 shows a diagram of a signal processing method 200 for dereverberating a number of input audio signals according to an implementation form.

The signal processing method 200 comprises the following steps.

Step 201: Transforming the number of input audio signals into a transformed domain to obtain input transformed coefficients.

Further, the input transformed coefficients being arranged to form an input transformed coefficient matrix.

Step 203: Determining filter coefficients upon the basis of eigenvalues of a signal space.

Further, the filter coefficients being arranged to form a filter coefficient matrix.

Step 205: Convolving input transformed coefficients of the input transformed coefficient matrix by filter coefficients of the filter coefficient matrix to obtain output transformed coefficients.

Further, the output transformed coefficients being arranged to form an output transformed coefficient matrix.

Step 207: Inversely transforming the output transformed coefficient matrix from the transformed domain to obtain a number of output audio signals.

The signal processing method 200 can be performed by the signal processing apparatus 100. Further features of the signal processing method 200 can directly result from the functionality of the signal processing apparatus 100 as described above and below in further detail.

Figure 3:
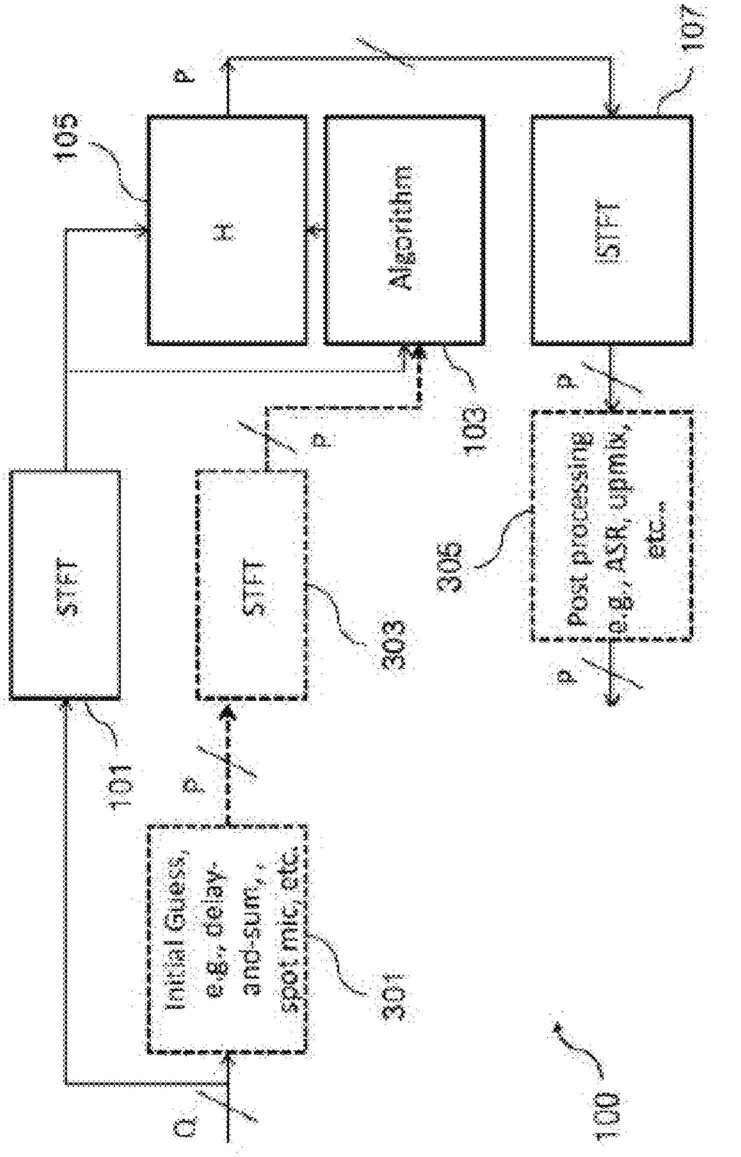
FIG. 3 shows a diagram of a signal processing apparatus for dereverberating a number of input audio signals according to an implementation form.

FIG. 3 shows a diagram of a signal processing apparatus 100 for dereverberating a number of input audio signals according to an implementation form. The signal processing apparatus 100 comprises a transformer 101, a filter coefficient determiner 103, a filter 105, an inverse transformer 107, an auxiliary audio signal generator 301, another transformer 303, and a post-processor 305.

The transformer 101 can be a SIFT transformer. The filter coefficient determiner 103 can perform an algorithm. The filter 105 can be characterized by a filter coefficient matrix H. The inverse transformer 107 can be an inverse STFT (ISTFT) transformer. The auxiliary audio signal generator 301 can provide an initial guess, e.g. using a delay-and-sum technique and/or spot microphone audio signals. The other transformer 303 can be a STFT transformer. The post-processor 305 can provide post-processing capabilities, e.g. an automatic speech recognition (ASR), and/or an up-mixing.

A number Q of input audio signals can be provided to the transformer 101 and the auxiliary audio signal generator 301. The auxiliary audio signal generator 301 can provide a number of P auxiliary audio signals to the other transformer 303. The other transformer 303 can provide a number P of rows or columns of an auxiliary transformed coefficient matrix to the filter coefficient determiner 103. The filter 105 can provide a number P of rows or columns of an output transformed coefficient matrix to the inverse transformer 107. The inverse transformer 107 can provide a number P of output audio signals to the post-processor 305 yielding a number P of post-processed audio signals.

The diagram shows an overall architecture of the apparatus 100. The input to the apparatus 100 can be microphone signals. These can optionally be preprocessed by an algorithm offering spatial selectivity, e.g. a delay-and-sum beamformer. The preprocessed signals and/or microphone signals can be analyzed by an STFT. The microphone signals can then be stored in a buffer with optionally variable size for the different frequency bins. The algorithms can calculate filter coefficients based on the buffered audio signal time intervals or frames. The buffered signal can be filtered in each frequency bin with a calculated complex filter. The output of the filtering can be transformed back to the time domain. The processed audio signals can optionally be fed into the post-processor 305, such as for ASR or up-mixing.

Some implementation forms can relate to blind single-channel and/or multi-channel minimization of an acoustical influence of an unknown room. They can be employed in multi-channel acquisition systems in telepresence for enhancing the ability of the systems to focus onto a part of a captured acoustic scene, speech and signal enhancement for mobiles and tablets, in particular by dereverberation of signals in a hands-free mode, and also for up-mixing of mono signals.

For this purpose, an approach for blind dereverberation and/or source separation can be used. The approach can be specialized to a single-channel case and can be used as a blind source separation post-processing stage.

The propagation of sound waves from a sound source to a predefined measurement point under typical conditions can be described by convolving the sound source signal with a Green's function which can solve an inhomogeneous wave equation under given boundary conditions. The boundary conditions, however, may not be controllable and may result in undesired acoustic characteristics such as long reverberation time which can cause insufficient intelligibility. In advanced communication systems which are able to synthesize a user defined acoustic environment, it can be desirable to mitigate the influence of the recording room and to maintain only a clean excitation signal to integrate it properly in the desired virtual acoustic environment.

In the case of multiple sound sources, e.g. speakers, captured by a distributed microphone array in a recording room, dereverberation can offer original clean source signals separated and free of the recording room influence, e.g. speech signals as would be recorded by a microphone next to the mouth of a single speaker in an anechoic chamber.

Dereverberation techniques can aim at minimizing the effect of the late part of the room impulse response. However, a full deconvolution of the microphone signals can be challenging and the output can be a less reverberant mixture of the source signals but not separated source signals.

Dereverberation techniques can be classified into single-channel and multi-channel techniques. Due to theoretical limits, an ideal deconvolution can typically be achieved in the multi-channel case where the number of recording microphones Q can be higher than the number of active sound sources P, e.g. speakers.

Multi-channel dereverberation techniques can aim at inverting an MIMO FIR, system between the sound sources and the microphones wherein each acoustic path between a sound source and a microphone can be modelled by an FIR filter of length L. The MIMO system can be presented in time domain as a matrix that can be invertible if it is square and regular. Hence, an ideal inversion can be performed if the following two conditions hold.

First, the length L' of a finite inverse filter fulfils the following equation:

$$L' = \frac{P(L-1)}{Q-P}. \tag{1}$$

Second, the individual filters of the MIMO system do not exhibit common roots in the z-domain.

An approach to estimate an ideal inverse system can be employed. The approach can be based on exploiting a non-Gaussianity, a non-whiteness, and a non-stationarity of the source signals. The approach can feature a minimum distortion on the cost of a high computational complexity for the computation of higher order statistics. Moreover, since it can aim at solving an ideal inversion problem, it may require from the system to have more microphones than sound sources and may not be applicable for a single channel problem.

Another approach to dereverberate a multi-channel recording can be based on estimating a signal subspace. Ambient and direct parts of the audio signal can be estimated separately. Late reverberations can be estimated and can be treated as noise. Therefore, the approach may require an accurate estimation of the ambient part, i.e. the late reverberations, to be able to cancel it. The approaches based on estimating a multi-channel signal subspace can be dedicated to reduce the reverberance and not to de-mix, i.e. to separate, the sound sources. The approaches are typically applied to multi-channel setups and may not be used to solve a single channel dereverberation problem. Additionally, heuristic statistical models to estimate the reverberation and to reduce the ambient part can be employed. These models may be based on training data and may suffer from a high complexity.

A further approach to estimate diffuse and direct components in the spectral domain can be employed. The short-time spectra of a multi-channel signal can be down-mixed into $X_1(k,n)$ and $X_2(k,n)$, where k and n denote a frequency bin index and a time interval or frame index. A real coefficient H(k,n) can be derived to extract the direct components $\hat{S}_1(k,n)$ and $\hat{S}_2(k,n)$ from the down-mix according to the following equations:

$$\hat{S}_1(k,n)=H(k,n)\cdot X_1(k,n)$$

$$\hat{S}_2(k,n)=H(k,n)\cdot X_2(k,n).$$

Under the assumption that direct and diffuse components in the down-mix are mutually uncorrelated and the diffuse components in the down-mix have equal power, the real coefficient H(k,n) can be calculated based on a Wiener optimization criterion according to the following equation:

$$H(k,n) = \frac{P_S}{P_S + P_A},$$

where $P_S$ and $P_A$ are the sums of the short-time power spectral estimates of the direct and diffuse components in the down-mix. $P_S$ and $P_A$ can be derived based on the cross-correlation of the down-mix as $\mathrm{Re}(E\{X_1X_2^*\})$. These filters can further be applied to multi-channel audio signals to generate the corresponding direct and ambient components. This approach can be based on a multi-channel setup and may not solve a single channel dereverberation problem. Moreover, it may introduce a high amount of distortion and may not perform a de-mixing.

Single channel dereverberation solutions can be based on the minimum statistics principle. Therefore, they may estimate the ambient and the direct part of the audio signal separately. An approach that incorporates a statistical system model can be employed which can be based on training data. Another approach can be applied on a single channel setup offering limited performance in complex sound scenes, especially with respect to the audio signal quality since the approach can be optimized for automatic speech recognition and not for a high quality listening experience.

Some implementation forms can relate to single-channel and multi-channel dereverberation techniques. In order to obtain a dry output audio signal, an M-taps MIMO FIR filter in the STFT domain with P outputs, i.e. number of audio signal sources, and Q inputs, i.e. number of input audio signals, number of microphones, or number of outputs of a preprocessing stage such as a beamformer, e.g. a delay-and-sum beamformer, can be applied. The filter 105 can be designed in a way that each output audio signal can be coherent to its own history within a predefined set of consequent time intervals or frames and can be orthogonal to the history of the other audio source signals.

In the following, a mathematical setup and a signal model is introduced used to derive the dereverberation approach. The input audio signal $x_q$ at a time instant t can be given as a convolution of a dry excitation audio source signal $s(t):=[s_1(t), s_2(t), \ldots, s_P(t)]^T$ convolved with Green's functions for the $p^{th}$ source to the $q^{th}$ input or microphone $g_q(t):=[g_{1q}, g_{2q}, \ldots, g_{Pq}]^T$:

$$x_q(t) = \sum_{p=1}^{P} s_p(t) * g_{pq}(x). \tag{2}$$

By considering this equation in the short time Fourier domain, it can be approximated as:

$$X_q(k,n) \approx [S_1, S_2, \ldots, S_P] \cdot [G_{1q}, G_{2q}, \ldots, G_{Pq}]^H, \tag{3}$$

wherein k denotes a frequency bin index and the time interval or frame is indexed by n, $[\bullet]^H$ denotes a Hermitian transpose, and the dependencies of both the audio signal source signals and the Green's functions on (n, k) are avoided for clarity of notation. For a complete multi-channel representation, it can be written for the MIMO system:

$$X(k, n) \approx [S_1, S_2, \ldots, S_P] \cdot \begin{bmatrix} G_{11} & \ldots & G_{P1} \\ \vdots & \ddots & \vdots \\ G_{1Q} & \ldots & G_{PQ} \end{bmatrix}^H, \tag{4}$$

$$X(k, n) \approx S^T(k, n) \cdot G^H(k, n),$$

with $$X := [X_1(k, n), X_2(k, n), \ldots, X_Q(k, n)]^T, \tag{5}$$

$$S := [S_1(k, n), S_2(k, n), \ldots, S_P(k, n)]^T, \tag{6}$$

$$G := \begin{bmatrix} G_{11} & \ldots & G_{P1} \\ \vdots & \ddots & \vdots \\ G_{1Q} & \ldots & G_{PQ} \end{bmatrix}. \tag{7}$$

A dereverberation can be performed using an FIR filter in the SIFT domain, for example based on applying an FIR filter according to:

$$H(k, n) := \begin{bmatrix} h_{11}(k, n) & \ldots & \ldots & \ldots & h_{P1}(k, n) \\ \vdots & \ddots & \ddots & \ddots & \vdots \\ \vdots & h_{pq}(k, n) & \ddots & \ddots & \vdots \\ \vdots & \ddots & \ddots & \ddots & \vdots \\ h_{1Q}(k, n) & \ldots & \ldots & \ldots & h_{PQ}(k, n) \end{bmatrix}, \tag{8}$$

with $h_{pq}(k,n):=[H_{pq}(k,n), H_{pq}(k,n-1), \ldots, H_{pq}(k,n-M+1)]^T$ in the SIFT domain on the input audio signal $$\hat{S}(k,n) := H^H(k,n)x(k,n), \tag{9}$$

wherein a sequence of M consecutive SIFT domain time intervals or frames of the input audio signal is defined as:

$$x_q(k,n) := [X_q(k,n), X_q(k,n-1), \ldots, X_q(k,n-M+1)]^T \tag{10}$$

and $$x(k,n) := [x_1^T(k,n), x_2^T(k,n), \ldots, x_q^T(k,n), \ldots, x_Q^T(k,n)]^T, \tag{11}$$

$$\hat{S}(k,n) := [\hat{S}_1(k,n), \hat{S}_2(k,n), \ldots, \hat{S}_P(k,n)]^T. \tag{12}$$

Note that M can be chosen individually for each frequency bin. For example, for a speech signal using a sampling frequency of 16 kilohertz (kHz), a SIFT window size of 320, a SIFT length of 512, an overlapping factor of 0.5, and a reverberation time of approximately 1 second, M can be set to 4 for the lower 129 bins, and can be set to 2 for the higher 128 bins.

The filter coefficient matrix H can approximate the largest eigenvectors of the auto correlation matrix of the unknown dry audio source signal. It can be desirable to obtain a distortion less estimate of the dry audio source signal. This can mean that the FIR filter exhibits fidelity to the coherent part of the dry audio source signal.

The input audio signal can be decomposed into a part which is coherent with an initial estimation of the dry audio source signal $x_c$, and an incoherent part $x_i$ according to:

$$x(k,n) = x_c(k,n) + x_i(k,n), \tag{13}$$

with $$x_c(k,n) := \Gamma_{xS}(k,n) \cdot S(k,n), \tag{14}$$

wherein a cross coherence matrix of the dry audio source signal can be defined as a normalized correlation matrix by:

$$\Gamma_{xS}(k,n) := \hat{\epsilon}\{x(k,n)S^H(k,n)\} \cdot (\phi_{SS}(k,n))^{-1}, \tag{15}$$

wherein $\hat{\epsilon}\{\bullet\}$ denotes an estimation of an expectation value, and with the estimation of the expectation of auto correlation matrix $$\phi_{SS}(k,n) := \hat{\epsilon}\{S(k,n)S^H(k,n)\}. \tag{16}$$

The cross coherence matrix $\Gamma_{xS}$ can be understood as enforced eigenvectors matrix of the auto correlation matrix of the input audio signal.

The estimation of the expectation value can be calculated iteratively by $$\hat{\epsilon}\{x(k,n)S^H(k,n)\} = \alpha\hat{\epsilon}\{x(k,n-1)S^H(k,n-1)\} + (1-\alpha)x(k,n)S^H \tag{17}$$

$$\hat{\epsilon}\{S(k,n)S^H(k,n)\} = \alpha\hat{\epsilon}\{S(k,n-1)S^H(k,n-1)\} + (1-\alpha)S(k,n)S^t \tag{18}$$

wherein $\alpha$ denotes a forgetting factor.

Hence, a condition for the dereverberation filter can be set as:

$$H^H\hat{\epsilon}\{x(k,n)S^H(k,n)\} = \phi_{SS} \tag{19}$$

By rearranging, the following expression can be obtained:

$$H^H\Gamma_{xS} = I_{P \times P}, \tag{20}$$

wherein I denotes a unity matrix. Therefore, the filter coefficient matrix H can be coincident to the basis vectors $\Gamma_{xS}$ of the signal subspace.

An optimal dereverberation FIR filter in the STFT domain can be derived. To obtain an optimal filter, the following cost function which can be constrained by (20) can be set:

$$J = H^H\Phi_{xx}H + \lambda(H^H\Gamma_{xS} - I_{P \times P}), \tag{21}$$

wherein $$\Phi_{xx} := \hat{\epsilon}\{xx^H\} \tag{22}$$

wherein λ denotes a Lagrange multipliers matrix. At a minimum of this cost function, the gradient can be zero, and the optimal expression of the filter can be obtained as:

$$H=\Phi_{xx}^{-1}\Gamma_{xS}\cdot(\Gamma_{xS}^{H}\Phi_{xx}^{-1}\Gamma_{xS})^{-1}. \quad (23)$$

The filter can maximize the entropy of the dry audio signal under the given condition.

The cross coherence matrix can be approximated. In the following, two possibilities to deal with the missing unknown dry audio source signal are proposed.

Figure 4:
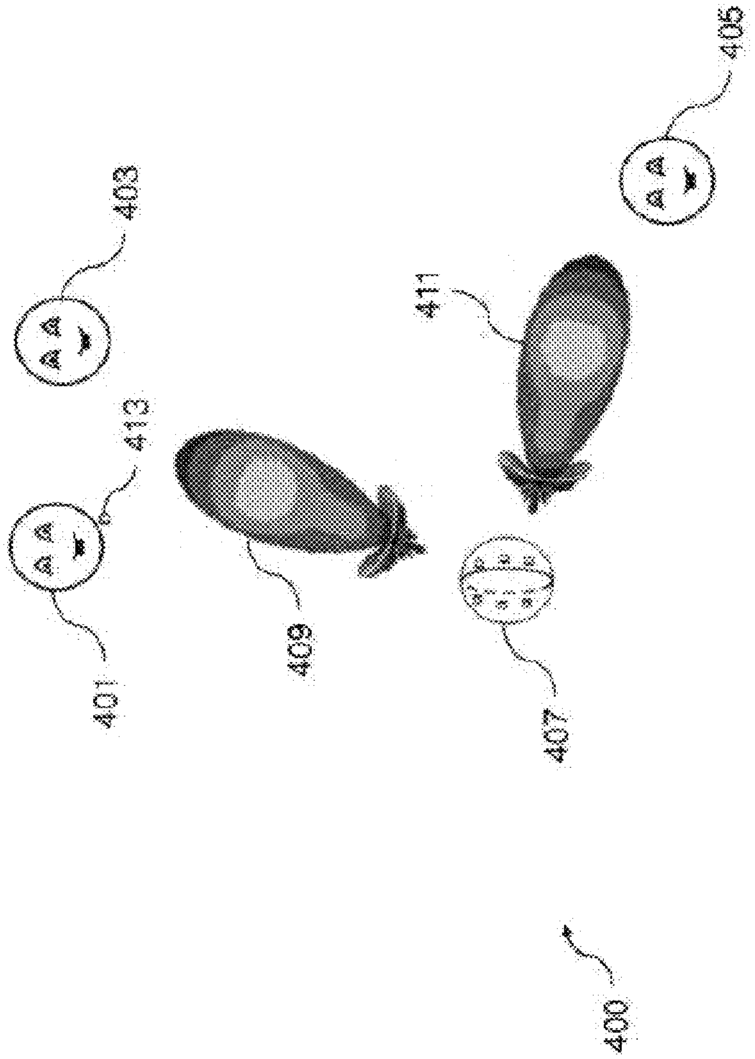
FIG. 4 shows a diagram of an audio signal acquisition scenario according to an implementation form.

FIG. 4 shows a diagram of an audio signal acquisition scenario 400 according to an implementation form. The audio signal acquisition scenario 400 comprises a first audio signal source 401, a second audio signal source 403, a third audio signal source 405, a microphone array 407, a first beam 409, a second beam 411, and a spot microphone 413. The first beam 409 and the second beam 411 are synthesized by the microphone array 407 by a beamforming technique.

The diagram shows the audio signal acquisition scenario 400 with three audio signal sources 401, 403, 405 or speakers, a microphone array 407 with the ability of achieving high sensitivity in dedicated directions, e.g. using beamforming, e.g. a delay-and-sum beamformer, and a spot microphone 413 next to one audio signal source. Separated audio sources 401, 403, 405 with a minimized room influence can be desired. The output of the beamformer and the auxiliary audio signal of the spot microphone 413 can be used to calculate or estimate the cross coherence matrix $\Gamma_{xS}$.

The algorithm can handle the output of the beamformer and of the spot microphone, i.e. the auxiliary audio signals, as an initial guess, enhance the separation and minimize the reverberation of the input audio signal or microphone array signal to provide a clean version of the three audio source signals or speech signals.

For calculating the derived filter coefficient matrix, a computation of a cross coherence matrix can be performed. Therefore, a pre-processing stage can be employed, e.g. a source localization stage combined with beamforming, providing an initial guess of the dry audio source signals $s_{0_1}$, $s_{0_2}$, . . . , $s_{0_P}$, or even a combination with a spot microphone for a subset of the audio sources.

For the filter, the following expression can be obtained $$H=\Phi_{xx}^{-1}\Gamma_{xS_0}\cdot(\Gamma_{xS_0}^{H}\Phi_{xx}^{-1}\Gamma_{xS_0})^{-1}, \quad (24)$$

wherein $F_{xS_0}$ can be defined by the same expression as in Eq. (15) but using the initial guess instead of the dry audio source signal.

Figure 5:
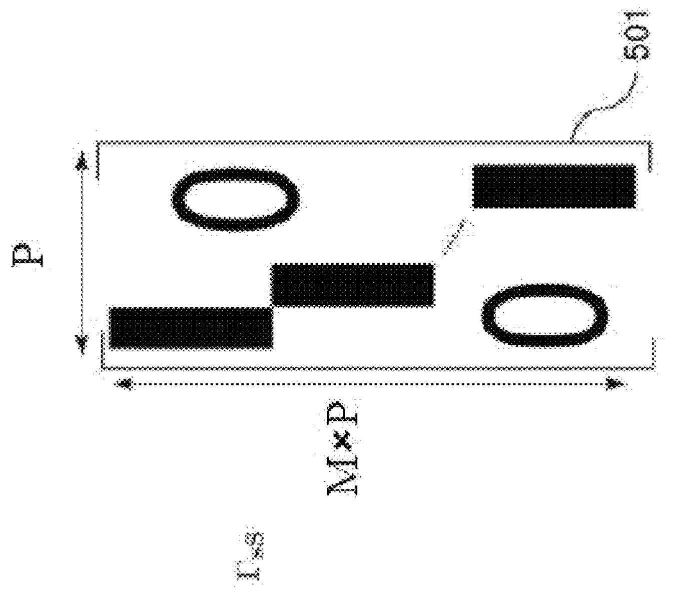
FIG. 5 shows a diagram of a structure of an auto coherence matrix according to an implementation form.

FIG. 5 shows a diagram of a structure of an auto coherence matrix 501 according to an implementation form. The diagram shows a block-diagonal structure. The auto coherence matrix 501 can relate to $\Gamma_{sS}$. The auto coherence matrix 501 can comprise M×P rows and P columns.

Figure 6:
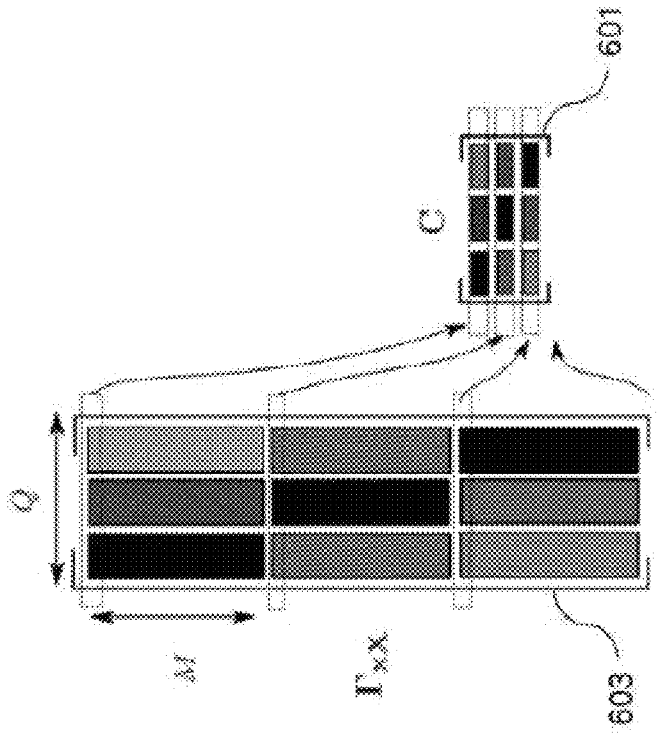
FIG. 6 shows a diagram of a structure of an intermediate matrix according to an implementation form.

FIG. 6 shows a diagram of a structure of an intermediate matrix 601 according to an implementation form. The diagram shows further an auto coherence matrix 603. The intermediate matrix 601 can relate to C. The intermediate matrix 601 or matrix C can be constructed based on a system with P=3 input audio signals or microphones. The auto coherence matrix 603 can comprise portions having M rows and can comprise Q columns. The auto coherence matrix 603 can relate to $\Gamma_{xX}$.

In the case P=Q, the condition in (20) can be modified for coherence of the output audio signals according to:

$$H^{H}\Gamma_{sS}=I_{P\times P}. \quad (25)$$

For the case P=Q, it can be assumed that each source of the dry audio source signal is coherent with regard to its own history. Based on the assumptions, $\Gamma_{sS}$ can be used instead of $\Gamma_{xS}$. Reverberations and interfering signals can be incoherent.

The auto coherence matrix of the audio source signal can be defined as $$\Gamma_{sS}(k,n):=\hat{\epsilon}\{s(k,n)S^{H}(k,n)\}\cdot(\phi_{SS}(k,n))^{-1}, \quad (26)$$

wherein the quantity $\Phi_{SS}$ can have a similar definition as (16):

$$\phi_{SS}(k,n):=\hat{\epsilon}\{S(k,n)S^{H}(k,n)\}. \quad (27)$$

The auto coherence matrix $\Gamma_{sS}$ of the audio sources can be block diagonal. Furthermore, in the spirit of $\Gamma_{xS}$ an auto coherence matrix of the input audio signal can be introduced as:

$$\Gamma_{xX}(k,n):=\hat{\epsilon}\{x(k,n)X^{H}(k,n)\}\cdot(\phi_{XX}(k,n))^{-1}, \quad (28)$$

wherein the quantity $\phi_{XX}$ can have a similar definition as (16):

$$\phi_{XX}(k,n):=\hat{\epsilon}\{X(k,n)X^{H}(k,n)\}. \quad (29)$$

By assuming the Green's functions in (4) to be constant for the considered M time intervals or frames, it can be seen that:

$$\Gamma_{xX}(k,n)=\hat{\epsilon}\{x(k,n)S^{H}(k,n)\}\cdot(\phi_{SX}(k,n))^{-1}, \quad (30)$$

with $$\phi_{SX}:=\hat{\epsilon}\{S(k,n)X^{H}(k,n)\}. \quad (31)$$

In order to obtain an expression for $\Gamma_{sS}$, approximations can be made by assuming the audio source signals to be independent, i.e. $\phi_{SS}$ can be diagonal and $\hat{\epsilon}\{s(k,n)S^{H}(k,n)\}$ can be block diagonal, and by taking into account the relation (30) for P=Q:

$$\Gamma_{xX}(k,n)=I_{M}\otimes G^{*}\cdot\hat{\epsilon}\{s(k,n)S^{H}(k,n)\}\cdot(\phi_{SX}(k,n))^{-1}, \quad (32)$$

wherein $\otimes$ denotes a Kronecker product. Hence, in order to approximate $\Gamma_{sS}$, we can use $\sigma_{xX}$ and can set the off diagonal blocks to zero. This can be achieved by setting a square, non-necessarily symmetric, intermediate matrix C whose rows are the $(j\cdot M+1)^{th}$ row of the auto coherence matrix of the input audio signal, with $j\in\{0, \ldots, P-1\}$. Note, that the order may be maintained.

An eigenvalue decomposition can allow to write C as a product $U\cdot\underline{C}\cdot U^{-1}$, wherein $\underline{C}$ can be diagonal. An estimate $\Gamma_{sS}$(k,n) for the block diagonal form for Γ can be obtained as:

$$\hat{\Gamma}_{sS}(k,n):=(I_{M}\otimes U^{-1})\cdot\Gamma_{xX}\cdot U. \quad (33)$$

To obtain a filter coefficient matrix that provides the coherent part of the audio signal sources, the following can be set similarly to Eq. (24):

$$H=\Phi_{xx}^{-1}\hat{\Gamma}_{sS}\cdot(\hat{\Gamma}_{sS}^{H}\Phi_{xx}^{-1}\hat{\Gamma}_{sS})^{-1}. \quad (34)$$

In addition, a blind channel estimation can be performed. An expression of the estimated inverse channel can be obtained by the following considerations for $X_P(k,n)\neq 0$:

$$\hat{S}(k,n)=H^{H}x(k,n)\mathrm{diag}\{X_1(k,n), X_2(k,n), \ldots, X_P(k,n)\}^{-1}\cdot\mathrm{diag}\{X_1(k,n), X_2(k,n), \ldots, X_P(k,n)\}, \quad (35)$$

wherein the operator diag{.} creates a diagonal square matrix with an argument vector on the main diagonal. Comparing this equation to the assumed channel model in the STFT domain in (3) leads to:

$$\hat{G}(k,n)=(H^{H}x(k,n)\mathrm{diag}\{X_1(k,n), X_2(k,n), \ldots, X_P(k,n)\}^{-1})^{-1}. \quad (36)$$

Figure 7:
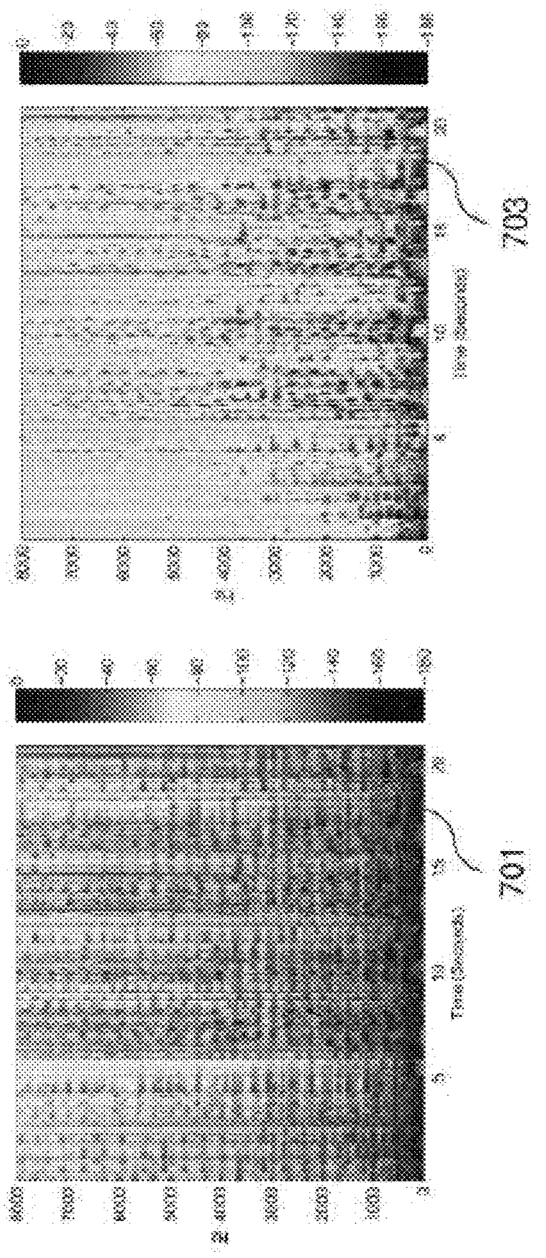
FIG. 7 shows a spectrogram of an input audio signal and a spectrogram of an output audio signal according to an implementation form.

FIG. 7 shows a spectrogram 701 of an input audio signal and a spectrogram 703 of an output audio signal according to an implementation form. In the spectrograms 701, 703, a magnitude of a corresponding STFT is color-coded over time in seconds and frequency in Hertz.

The spectrogram 701 can further relate to a reverberant microphone signal and the spectrogram 703 can further relate to an estimated dry audio source signal. In this example for a single channel, the spectrogram 701 of the reverberant signal is smeared out. Comparatively, the spectrogram 703 of the estimated dry audio source signal by applying the dereverberation algorithm exhibits a structure of a typical dry speech signal.

Figure 8:
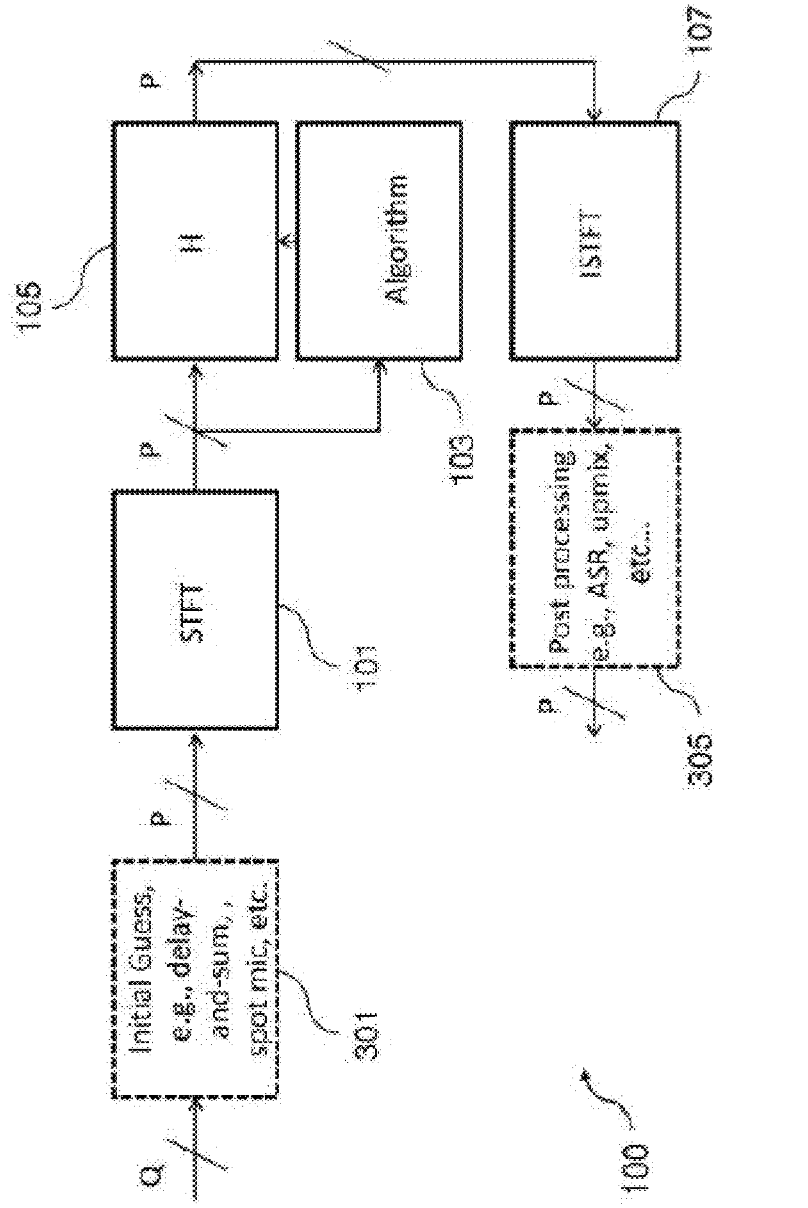
FIG. 8 shows a diagram of a signal processing apparatus for dereverberating a number of input audio signals according to an implementation form.

FIG. 8 shows a diagram of a signal processing apparatus 100 for dereverberating a number of input audio signals according to an implementation form. The signal processing apparatus 100 comprises a transformer 101, a filter coefficient determiner 103, a filter 105, an inverse transformer 107, an auxiliary audio signal generator 301, and a post-processor 305.

The transformer 101 can be a STFT transformer. The filter coefficient determiner 103 can perform an algorithm. The filter 105 can be characterized by a filter coefficient matrix H. The inverse transformer 107 can be an ISTFT transformer. The auxiliary audio signal generator 301 can provide an initial guess, e.g. using a delay-and-sum technique and/or spot microphone audio signals. The post-processor 305 can provide post-processing capabilities, e.g. an ASR, and/or an up-mixing.

A number Q of input audio signals can be provided to the auxiliary audio signal generator 301. The auxiliary audio signal generator 301 can provide a number P of auxiliary audio signals to the transformer 101. The transformer 101 can provide a number P of rows or columns of an input transformed coefficient matrix to the filter coefficient determiner 103 and the filter 105. The filter 105 can provide a number P of rows or columns of an output transformed coefficient matrix to the inverse transformer 107. The inverse transformer 107 can provide a number P of output audio signals to the post-processor 305 yielding a number P of post-processed audio signals.

Embodiments of the disclosure may have several advantages. They can be used for post-processing for audio source separation achieving an optimal separation even with a low complexity solution for an initial guess. This can be used for enhanced sound-field recordings. It can further be used even for a single-channel dereverberation which can be a benefit to speech intelligibility for hands-free application using mobiles and tablets. They can further be used for up-mixing for multi-channel reproduction even from a mono recording and for pre-processing for ASR.

Some implementation forms can relate to a method to modify a multi- or single-channel audio signal obtained by recording one or multiple audio signal sources in a reverberant acoustic environment, the method comprises minimizing the influence of the reverberations caused by the room and separating the recorded audio sound sources. The recording can be done by a combination of a microphone array with the ability to perform pre-processing as localization of the audio signal sources and beamforming, e.g. delay-and-sum, and distributed microphones, e.g. spot microphones, next to a subgroup of the audio signal sources.

The non-preprocessed input audio signals or array signals and the pre-processed signals together with available distributed spot microphones can be analyzed using a STFT and can be buffered. The length of the buffer, e.g. length M, can be chosen individually for each frequency band. The buffered input audio signals can be combined in the short time Fourier transformation domain to obtain 2-multidimensional complex filters for each sub-band that can exploit the inter time interval or inter-frame statistics of the audio signals. The dry output audio signals, i.e. the separated and/or dereverbed input audio signals, can be obtained by performing a multi-dimensional convolution of the input audio signals or array microphone signals with those filters. The convolution can be performed in the short time Fourier transformation domain.

The filters can be designed to fulfill the condition of maximum entropy of the output audio signals in the STFT domain constrained by maintaining the coherence, e.g. normalized cross correlation, between the pre-processed audio signal and the distributed spot microphones on one side and the input audio signals or array microphone signals on the other side according to:

$$H=\Phi_{xx}^{-1}\Gamma_{xS_0}\cdot(\Gamma_{xS_0}{}^{H}\Phi_{xx}^{-1}\Gamma_{xS_0})^{-1}.$$

Some implementation forms can further relate to a method wherein a pre-processing stage can be unavailable and the filters can be designed to maintain the coherence of each audio source signal to its own history and the independence of the audio signal sources in the STFT domain according to:

$$H=\Phi_{xx}^{-1}\hat{\Gamma}_{sS}\cdot(\hat{\Gamma}_{sS}{}^{H}\Phi_{xx}^{-1}\hat{\Gamma}_{sS})^{-1}.$$

An estimate of an auto coherence matrix of the audio source signals can be calculated by means of an eigenvalue decomposition of a square matrix whose rows can be selected from the rows of an auto coherence of the input audio signals or microphone signals. The number of rows can be determined by the number of separable audio signal sources which may maximally be the number of inputs or microphones. The matrix U containing in its columns the eigenvectors of the so-constructed matrix C can be inverted and the estimate of the audio source auto coherence matrix can be calculated by:

$$\hat{\Gamma}_{sS}(k,n):=(I_M\otimes U^{-1})\cdot\Gamma_{xX}\cdot U.$$

Some implementation forms can further relate to a method to estimate acoustic transfer functions based on the calculated optimal 2-dimensional filters according to:

$$\hat{G}(k,n)=(H^{H}x(k,n)\operatorname{diag}\{X_1(k,n),\ X_2(k,n),\ \ldots\ ,X_P(k,n)\}^{-1})^{-1}.$$

Some implementation forms can allow for a processing in the SIFT domain. It can provide high system tracking capabilities because of an inherent batch block processing and high scalability, i.e. the resolution in time and frequency domain can freely be chosen using suitable windows. The system can approximately be decoupled in the SIFT domain. Therefore, the processing can be parallelized for each frequency bin. Furthermore, different sub-bands can be treated independently, e.g. different filter orders for dereverberation for different sub-bands can be used.

Some implementation forms can use a multi-tap approach in the STFT domain. Therefore, inter time interval or inter-frame statistics of the dry audio signals can be exploited. Each dry audio signal can be coherent to its own history. Therefore, it can be statistically represented over a predefined time by only one eigenvector. The eigenvectors of the audio source signals can be orthogonal.

What is claimed is:

1. A signal processing apparatus for dereverberating a number of input audio signals, comprising:

a memory; and a processor coupled to the memory and configured to:

transform the number of input audio signals into a transformed domain to obtain input transformed coefficients, wherein the input transformed coefficients being arranged to form an input transformed coefficient matrix;

determine filter coefficients upon the basis of eigenvalues of a signal space, wherein the filter coefficients being arranged to form a filter coefficient matrix;

convolve the input transformed coefficients of the input transformed coefficient matrix by the filter coefficients of the filter coefficient matrix to obtain output transformed coefficients, wherein the output transformed coefficients being arranged to form an output transformed coefficient matrix; and inversely transform the output transformed coefficient matrix from the transformed domain to obtain a number of output audio signals.

2. The signal processing apparatus of claim 1, wherein the processor is further configured to determine the signal space upon the basis of an input auto correlation matrix of the input transformed coefficient matrix.

3. The signal processing apparatus of claim 1, wherein the processor is further configured to transform the number of input audio signals into frequency domain to obtain the input transformed coefficients.

4. The signal processing apparatus of claim 1, wherein the processor is further configured to transform the number of input audio signals into the transformed domain for a number of past time intervals to obtain the input transformed coefficients.

5. The signal processing apparatus of claim 4, wherein the processor is further configured to:

determine input auto coherence coefficients upon the basis of the input transformed coefficients, wherein the input auto coherence coefficients indicating a coherence of the input transformed coefficients associated to a current time interval and a past time interval, and wherein the input auto coherence coefficients being arranged to form an input auto coherence matrix; and determine the filter coefficients upon the basis of the input auto coherence matrix.

6. The signal processing apparatus of claim 1, wherein the processor is further configured to determine the filter coefficient matrix according to the equation $H=\Phi_{xx}^{-1}\Gamma_{xS_0}\cdot(\Gamma_{xS_0}^{H}\Phi_{xx}^{-1}\Gamma_{xS_0})^{-1}$, wherein the H denotes the filter coefficient matrix, wherein the x denotes the input transformed coefficient matrix, wherein the $S_0$ denotes an auxiliary transformed coefficient matrix, wherein the $\Phi_{xx}$ to denotes an input auto correlation matrix of the input transformed coefficient matrix, wherein $\Gamma_{xS_0}$ denotes a cross coherence matrix between the input transformed coefficient matrix and the auxiliary transformed coefficient matrix, and wherein the $\Gamma_{xS_0}^{H}$ denotes Hermitian transpose of the $\Gamma_{xS_0}$.

7. The signal processing apparatus of claim 6, wherein the processor is further configured to:

generate a number of auxiliary audio signals upon the basis of the number of input audio signals; and transform the number of auxiliary audio signals into the transformed domain to obtain auxiliary transformed coefficients, wherein the auxiliary transformed coefficients being arranged to form the auxiliary transformed coefficient matrix.

8. The signal processing apparatus of claim 1, wherein the processor is further configured to determine the filter coefficient matrix according to the equation $H=\Phi_{xx}^{-1}\hat{\Gamma}_{sS}\cdot(\hat{\Gamma}_{sS}^{H}\Phi_{xx}^{-1}\hat{\Gamma}_{sS})^{-1}$, wherein the H denotes the filter coefficient matrix, wherein the x denotes the input transformed coefficient matrix, wherein the $\Phi_{xx}$ denotes an input auto correlation matrix of the input transformed coefficient matrix, wherein the $\hat{\Gamma}_{sS}$ denotes an estimate auto coherence matrix, and wherein the $\hat{\Gamma}_{sS}^{H}$ denotes Hermitian transpose of the $\hat{\Gamma}_{sS}$.

9. The signal processing apparatus of claim 8, wherein the processor is further configured to determine the estimate auto coherence matrix according to the equation $\hat{\Gamma}_{sS}(k,n):=(I_M\otimes U^{-1})\cdot\Gamma_{xX}\cdot U$, wherein the $\hat{\Gamma}_{sS}$ denotes the estimate auto coherence matrix, wherein the x denotes the input transformed coefficient matrix, wherein the $\Gamma_{xX}$ denotes an input auto coherence matrix of the input transformed coefficient matrix, wherein the $I_M$ denotes an identity matrix of matrix dimension M, wherein the U denotes an eigenvector matrix of an eigenvalue decomposition performed upon the basis of the input auto coherence matrix, and wherein the $\otimes$ denotes a Kronecker product.

10. The signal processing apparatus of claim 1, wherein the processor is further configured to determine channel transformed coefficients upon the basis of the input transformed coefficients of the input transformed coefficient matrix and the filter coefficients of the filter coefficient matrix, wherein the channel transformed coefficients being arranged to form a channel transformed matrix.

11. The signal processing apparatus of claim 10, wherein the processor is further configured to determine the channel transformed matrix according to the equation $\hat{G}(k,n)=(H^{H}x(k,n)\mathrm{diag}\{X_1(k,n), X_2(k,n), \ldots, X_P(k,n)\}^{-1})^{-1}$, wherein the $\hat{G}$ denotes the channel transformed matrix, wherein the x denotes the input transformed coefficient matrix, wherein the H denotes the filter coefficient matrix, wherein the $H^{H}$ denotes Hermitian transpose of the H, and wherein the $X_1$ to $X_P$ denote the input transformed coefficients.

12. The signal processing apparatus of claim 1, wherein the number of input audio signals comprise audio signal portions being associated to a number of audio signal sources, and wherein the signal processing apparatus is configured to separate the number of audio signal sources upon the basis of the number of input audio signals.

13. A signal processing method for dereverberating a number of input audio signals, comprising:

transforming the number of input audio signals into a transformed domain to obtain input transformed coefficients, wherein the input transformed coefficients being arranged to form an input transformed coefficient matrix;

determining filter coefficients upon the basis of eigenvalues of a signal space, wherein the filter coefficients being arranged to form a filter coefficient matrix;

convolving the input transformed coefficients of the input transformed coefficient matrix by the filter coefficients of the filter coefficient matrix to obtain output transformed coefficients, wherein the output transformed coefficients being arranged to form an output transformed coefficient matrix; and inversely transforming the output transformed coefficient matrix from the transformed domain to obtain a number of output audio signals.

14. The signal processing method of claim 13, further comprising determining the signal space upon the basis of an input auto correlation matrix of the input transformed coefficient matrix.

15. A computer program, comprising a program code for performing a signal processing method when executed on a computer, wherein the signal processing method comprises:

transforming a number of input audio signals into a transformed domain to obtain input transformed coefficients, wherein the input transformed coefficients being arranged to form an input transformed coefficient matrix;

determining filter coefficients upon the basis of eigenvalues of a signal space, wherein the filter coefficients being arranged to form a filter coefficient matrix;

convolving the input transformed coefficients of the input transformed coefficient matrix by the filter coefficients of the filter coefficient matrix to obtain output transformed coefficients, wherein the output transformed coefficients being arranged to form an output transformed coefficient matrix; and inversely transforming the output transformed coefficient matrix from the transformed domain to obtain a number of output audio signals.

* * * * *